Sept. 13, 1932.   E. L. MASTERS   1,877,415
PLANT SETTER
Filed Oct. 6, 1930
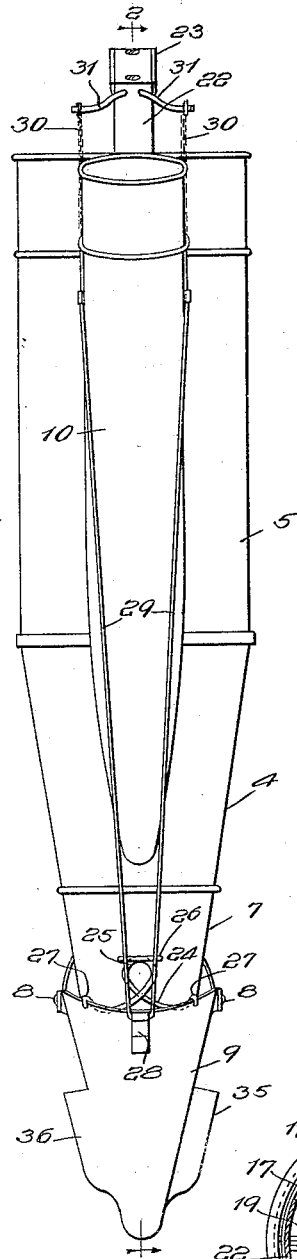
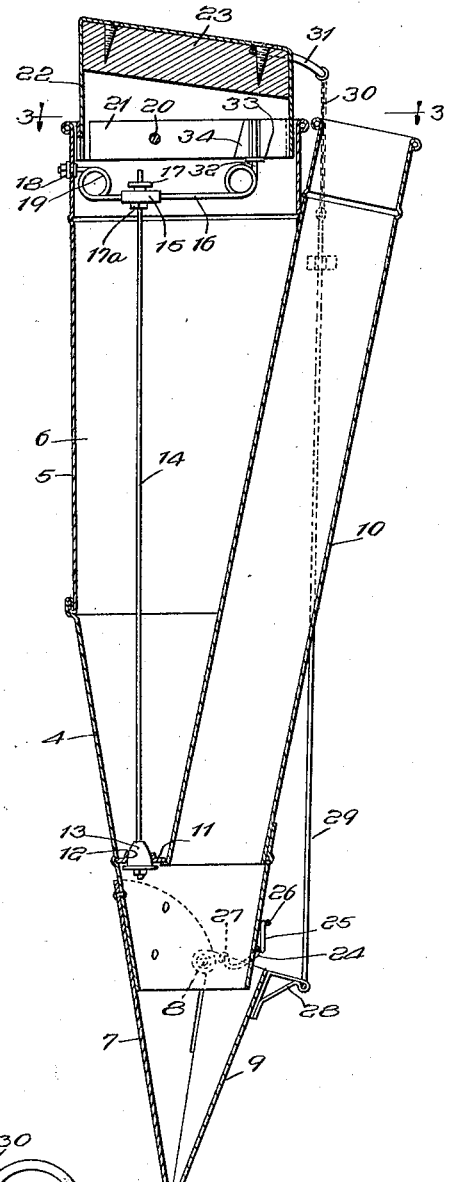
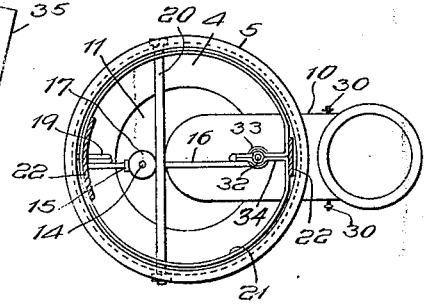
Inventor:
Edwin L. Masters
Hill & Hill Patented Sept. 13, 1932

1,877,415

UNITED STATES PATENT OFFICE

EDWIN L. MASTERS, OF CHICAGO, ILLINOIS

PLANT SETTER

Application filed October 6, 1930. Serial No. 486,706.

This invention relates generally to that class of devices known as plant setters, or the like, and particularly to a device for setting and planting tobacco, cabbage, tomatoes, and similar plants, that are usually first grown in beds and later transplanted and set in a field for further development.

The present invention relates particularly to novel means for actuating the valve which controls the supply of water used in conjunction with the operation of the setter, and also to means for actuating the shovels associated therewith.

Among other objects, the present invention is intended to provide novel means for conveniently and effectively controlling the water valve and shovels employed in the operation of the setter, and also to improve devices of the character disclosed in sundry details hereinafter described and particularly pointed out in the appended claims.

The present invention is in the nature of an improvement over the device shown and described in United States Letters Patent No. 1,120,211 issued December 8, 1914 in the name of Joseph H. Masters, deceased, by Clarissa C. Masters, executrix of the estate of said Joseph H. Masters.

One embodiment of the invention is shown for illustrative purposes in the accompanying drawing, in which Fig. 1 is a side elevation of a plant setter embodying features of the present invention;

Fig. 2 is a vertical sectional elevation of the plant setter shown in Fig. 1, and taken substantially as indicated by the line 2—2 thereof; and Fig. 3 is a sectional plan view taken on the line 3—3 of Fig. 2.

In the illustrative embodiment of the invention, casing members 4 and 5 are connected to form a reservoir 6 adapted to accommodate a considerable quantity of water, and also to make the device of convenient height or length when carried as hereinafter described.

Secured to the lower end of the member 4 is a shovel 7, and pivotally secured to the shovel 7 or to the part 4 or both at 8 is a movable cooperating shovel 9. Extending to the interior of the members 4 and 5, and arranged to discharge between the shovels 7 and 9 is a plant tube 10 which is preferably open at the bottom and below the partition 11 which forms the bottom of the water reservoir.

In the bottom of the reservoir is formed a discharge opening or outlet 12 normally closed by a valve 13 which may be conveniently actuated for controlling the discharge of water from the reservoir. Secured to the valve 13 is a rod 14 having its upper end adjustably screw-threaded into a sleeve 15 and a resilient arm 16 positioned adjacent the upper end of the casing member 5 forming a part of the reservoir 6. The upper end of the rod 14 is also provided with a jam nut 17 by which the rod may be secured in its adjusted position and held against accidental displacement or turning with respect to the arm 16. If desired, however, the screw-threaded end of the rod 14 may be slidably mounted in apertures formed in the sleeve 15 and arm 16, and secured in adjusted position with respect thereto by means of the nut 17 above the sleeve and a nut 17a at the underside of the sleeve.

The resilient arm 16, in the present construction, is secured at one of its end portions to the side of the casing member 5 by means of a nut 18 and is formed adjacent its fixed end with a coil 19 for providing suitable spring action to normally hold the valve 13 snugly against the seat 12 of the reservoir to prevent the escape of water therefrom.

Pivotally mounted on a rod or pivot member 20 adjacent the upper end of the reservoir 6 is a ring 21 positioned within the member 5 in a manner to provide a clearance between the ring and member, and rigidly secured to the ring 21 at opposite sides thereof, remote from the pivotal connections, are the end or bale portions 22 forming a part of a handle 23 by which the plant setter may be carried and manipulated when in operation. It will be noted that the grip portion of the handle is inclined at an angle to the reservoir and ring 21, thereby providing for convenient and comfortable grasping by the operator in a manner to require but slight wrist movement to tilt the handle about its pivotal connection.

The shovel 9 is normally maintained in closed position or in engagement with the shovel 7 by any suitable resilient means such, for example, as a spring 24 having a loop 25 formed adjacent its central portion and adapted to be engaged and held against the casing member 4 by means of a bracket 26, while the outer or free ends of the spring may be bent over the edge of the shovel 9 as indicated at 27 in a manner to urge the lower end of the shovel 9 toward the fixed shovel 7.

For conveniently actuating the shovel elements to move the shovel 9 away from the shovel 7 in a manner to permit the depositing of a plant in an opening formed in the ground by the shovels, the movable shovel 9 is provided with a laterally extending arm 28 connected to the lower end of a U-shaped member 29, the legs of which are connected adjacent their upper ends to the lower ends of flexible connectors, shown in the present instance as relatively short lengths of chain 30, the upper ends of which are connected to the free ends of a pair of arms 31 rigidly secured to the handle 23. It will be observed that by such an arrangement, a slight tilting of the handle 23 and ring 21 about the pivot member 20 in a counter-clockwise direction, as viewed in Fig. 2, will exert a pull on the connecting members 29 and 30, and through their connection with the arm 28 will cause the shovel 9 to be moved outwardly away from the shovel 7, thereby providing an opening through which a plant may be deposited into the hole previously formed by the insertion of shovels 7 and 9 into the ground.

For actuating the valve 13 in a manner to permit water to flow from the reservoir 6 during the plant setting operation, the resilient arm 16 is provided adjacent its free end with an upturned portion 32 having a collar 33 secured thereto adapted to be engaged by an inwardly extending projection 34 carried by the ring 21 and movable therewith. It will be noted that by such an arrangement, the tilting of the handle 23 and ring 21 in a clockwise direction as viewed in Fig. 2 will cause the projection 34 to engage the collar 33 and move the free end of the arm 16 downwardly, and by reason of its connection with the valve 13 through the rod 14, the valve will be moved downwardly and out of engagement with the seat 12, thereby permitting a desired quantity of water to flow from the reservoir and into the space between the shovels 7 and 9 where the plant is deposited in the ground.

It will be observed from the foregoing description that in operating or manipulating the plant setter, the device may be comfortably carried, and by a slight movement of the handle in one direction, will cause a suitable quantity of water to be deposited between the shovels 7 and 9, and that a slight movement of the handle 23 in the opposite direction will serve to separate the shovels and permit a plant to be deposited in the ground.

In the operation of the plant setter above described, the operator presses downwardly upon the handle 23 so as to force the shovels 7 and 9 a desired depth into the ground. When the soil is loose or in a most favorable condition, the weight of the setter when about two-thirds full of water will be sufficient to make a hole in the ground of suitable depth for ordinary setting. The handle 23 and ring 21 are then moved in a clockwise direction (see Fig. 2) about the pivot member 20 in a manner to open the valve 13 and permit water from the reservoir to pass downwardly into the ground between the shovels 7 and 9. The plant is then dropped down the plant tube 10 to enter and be positioned between the planter jaws or shovels and the operator then lifts the device, at the same time moving the handle 23 and ring 21 in the opposite, or counter-clockwise direction, thereby moving the shovel 9 away from the shovel 7 and permitting the plant to remain in the ground at the bottom of the hole. The operator may then kick the dirt on top of the roots, or if desired, may cover the base of the plant by giving the setter a slight turn when the lips 35 and 36 formed on the shovels 7 and 9, respectively, will act to scoop the dirt into the hole and cover the roots of the plant.

Obviously, the present invention is not limited to the precise construction and arrangement shown and described as the same may be variously modified. Moreover, all the features of the invention need not be used conjointly as the same may be used to advantage in various different combinations and subcombinations.

What I claim as new and desire to cover by Letters Patent is:

1. In a plant setter, the combination of a casing comprising a reservoir, a pair of relatively movable hole forming shovels mounted on said casing, a handle movably mounted on said casing, a valve positioned in said reservoir, means for actuating one of said shovels, and means operatively related to said valve and handle for actuating the valve by the movement of said handle.

2. In a plant setter, the combination of a casing comprising a reservoir, a pair of relatively movable hole forming shovels mounted on said casing, a handle movably mounted on said casing, a valve positioned in said reservoir, means for actuating said valve, and means operatively related to one of said shovels and to said handle for actuating said one of said shovels by the movement of said handle.

3. In a plant setter, the combination of a casing comprising a reservoir, a pair of hole forming shovels mounted on said casing, one of said shovels being movable with respect to the other, a valve positioned in said reservoir, a handle mounted on said casing and movable with respect thereto, and means operatively related to said valve and movable shovel and to said handle for actuating the valve and shovel by the movement of said handle.

4. In a plant setter, the combination of a casing comprising a reservoir, a pair of relatively movable hole forming shovels mounted on said casing, a valve positioned in said reservoir, a handle mounted on said casing and movable with respect thereto, means operatively related to one of said shovels and to said handle for actuating said shovel by the movement of said handle, and means operatively related to said valve and handle for actuating the valve by the movement of said handle.

5. In a plant setter, the combination of a casing comprising a reservoir, a pair of hole forming shovels mounted on said casing, one of said shovels being movable with respect to and independently of the other, a valve positioned in said reservoir, a handle mounted on said casing and movable with respect thereto, means operatively related to said movable shovel and handle for actuating said shovel to form a plant receiving hole by the movement of said handle in one direction, and means operatively related to said valve and handle for actuating the valve by the movement of said handle in another direction.

6. In a plant setter, the combination of a casing comprising a reservoir, a pair of hole forming shovels mounted on said casing, one of said shovels being movable with respect to the other, a valve positioned in said reservoir, a handle pivotally mounted on said casing, means operatively related to said movable shovel and handle for actuating said shovel by the movement of said handle in one direction, and means operatively related to said valve and handle for actuating the valve by the movement of said handle in the opposite direction.

7. In a plant setter, the combination of a casing comprising a reservoir, a pair of hole forming shovels mounted on and adjacent the lower end of said casing, one of said shovels being movable with respect to the other, a valve positioned in said reservoir, an arm mounted on said casing and operatively connected to said valve, a handle mounted on said casing and movable with respect thereto, means for actuating said movable shovel, and means operatively related to said handle and arm for actuating said valve.

8. In a plant setter, the combination of a casing comprising a reservoir, a pair of hole forming shovels mounted on and adjacent the lower end of said casing, one of said shovels being movable with respect to the other, a valve positioned in said reservoir, a resilient arm mounted on said casing and operatively connected to said valve, a handle pivotally mounted on said casing, means including a flexible element for actuating said movable shovel, and means operatively related to said handle and arm for actuating said valve.

9. In a plant setter, the combination of a casing comprising a reservoir, a pair of shovels mounted adjacent the lower end of said casing, one of said shovels being movable with respect to the other, a valve positioned in said reservoir, a yieldable spring actuated arm adjustably connected to said valve in a manner to hold the valve on its seat, a handle pivotally mounted on said casing and inclined normally at an angle with respect to the longitudinal center line thereof, means operatively related to said handle for actuating said movable shovel, and means movable with said handle and cooperable with said arm for opening said valve.

10. In a plant setter, the combination of a casing comprising a reservoir, a pair of shovels mounted adjacent the lower end of said casing, one of said shovels being movable with respect to the other, a valve positioned in said reservoir, a resilient arm mounted on said casing and adjustably connected to said valve, a ring pivotally mounted on said casing within the upper end thereof, a handle rigidly mounted on said ring and positioned at an angle with respect thereto, an inwardly extending projection carried by said ring and cooperable with the free end of said arm for opening said valve when the handle is moved in one direction, and means including a flexible element operatively connected to said movable shovel and handle for actuating said shovel when the handle is moved in the opposite direction.

In witness whereof I hereunto subscribe my name this 24th day of September A. D., 1930.

EDWIN L. MASTERS.